United States Patent
Power (10) Patent No.: US 10,445,141 B2
(45) Date of Patent: Oct. 15, 2019

(54) SYSTEM AND METHOD SUPPORTING SINGLE SOFTWARE CODE BASE USING ACTOR/DIRECTOR MODEL SEPARATION

(71) Applicant: Honeywell International Inc., Morris Plains, NJ (US)

(72) Inventor: Liam Power, Dunmore East (IE)

(73) Assignee: Honeywell International Inc., Morris Plains, NJ (US)

( * ) Notice: Subject to any disclaimer, the term of this patent is extended or adjusted under 35 U.S.C. 154(b) by 134 days.

(21) Appl. No.: 15/640,270

(22) Filed: Jun. 30, 2017

(65) Prior Publication Data

US 2018/0052712 A1 Feb. 22, 2018

Related U.S. Application Data

(60) Provisional application No. 62/376,642, filed on Aug. 18, 2016.

(51) Int. Cl.
*G06F 9/50* (2006.01)
*G06F 9/54* (2006.01)

(52) U.S. Cl.
CPC ............ *G06F 9/5005* (2013.01); *G06F 9/541* (2013.01); *G06F 9/546* (2013.01); *G06F 2209/5011* (2013.01); *G06F 2209/548* (2013.01)

(58) Field of Classification Search
None
See application file for complete search history.

(56) References Cited

U.S. PATENT DOCUMENTS

| | | | |
|---|---|---|---|
| 2002/0198925 A1 | 12/2002 | Smith et al. | |
| 2006/0075079 A1* | 4/2006 | Powers | G06F 9/5072 709/220 |
| 2007/0233282 A1 | 10/2007 | Fox et al. | |
| 2015/0135183 A1* | 5/2015 | Kipp | G06F 9/46 718/103 |
| 2016/0092268 A1* | 3/2016 | Gleyzer | G06F 9/44505 718/107 |
| 2016/0224373 A1* | 8/2016 | Harris | G06F 9/5027 |
| 2016/0321104 A1* | 11/2016 | Fang | G06F 9/4881 |
| 2017/0090997 A1* | 3/2017 | Bohm | G06F 9/52 |

* cited by examiner

*Primary Examiner* — Wynuel S Aquino (57) ABSTRACT

A method includes executing multiple actors associated with a software program. Each actor is associated with (i) data to be processed and (ii) a message queue configured to store messages received by the actor. The method also includes invoking execution of at least one message processing thread for each message received by each actor. The at least one message processing thread is contained in a thread pool that is external to the actors. The number of message processing threads in the thread pool is independent of the number of actors. The method further includes releasing the at least one message processing thread to the thread pool after the execution of the corresponding message is completed.

14 Claims, 9 Drawing Sheets

SYSTEM AND METHOD SUPPORTING SINGLE SOFTWARE CODE BASE USING ACTOR/DIRECTOR MODEL SEPARATION

CROSS-REFERENCE TO RELATED APPLICATION AND PRIORITY CLAIM

This application claims priority under 35 U.S.C. § 119(e) to U.S. Provisional Patent Application No. 62/376,642 filed on Aug. 18, 2016, which is hereby incorporated by reference in its entirety.

TECHNICAL FIELD

This disclosure relates generally to software design and execution. More specifically, this disclosure relates to a system and method supporting a single software code base using actor/director model separation.

BACKGROUND

Industrial process control and automation systems routinely include a wide variety of devices. These devices often range from smaller and resource-constrained devices (like sensors, actuators, and embedded controllers) to larger and more powerful devices (like enterprise servers). It is very hard to create software that scales from the smallest hardware devices with only one thread of execution up to the largest of enterprise servers with large resource reserves. This can increase the time, efforts, and costs associated with software development. Note that this problem is not limited to industrial process control and automation systems and can affect software development and execution in a large number of technology fields.

SUMMARY

This disclosure provides a system and method supporting a single software code base using actor/director model separation.

In a first embodiment, a method includes executing multiple actors associated with a software program. Each actor is associated with (i) data to be processed and (ii) a message queue configured to store messages received by the actor. The method also includes invoking execution of at least one message processing thread for each message received by each actor. The at least one message processing thread is contained in a thread pool that is external to the actors. The number of message processing threads in the thread pool is independent of the number of actors. The method further includes releasing the at least one message processing thread to the thread pool after the execution of the corresponding message is completed.

In a second embodiment, an apparatus includes at least one memory and at least one processor. The at least one memory is configured to store multiple actors associated with a software program. Each actor is associated with (i) data to be processed and (ii) a message queue configured to store messages received by the actor. The at least one processor is configured to execute the actors and invoke execution of at least one message processing thread for each message received by each actor. The at least one message processing thread is contained in a thread pool that is external to the actors. The number of message processing threads in the thread pool is independent of the number of actors. The at least one processor is also configured to release the at least one message processing thread to the thread pool after the execution of the corresponding message is completed.

In a third embodiment, a non-transitory computer readable medium contains instructions that, when executed by at least one processing device, cause the at least one processing device to execute multiple actors associated with a software program. Each actor is associated with (i) data to be processed and (ii) a message queue configured to store messages received by the actor. The medium also contains instructions that, when executed by the at least one processing device, cause the at least one processing device to invoke execution of at least one message processing thread for each message received by each actor. The at least one message processing thread is contained in a thread pool that is external to the actors. The number of message processing threads in the thread pool is independent of the number of actors. The medium further contains instructions that, when executed by the at least one processing device, cause the at least one processing device to release the at least one message processing thread to the thread pool after the execution of the corresponding message is completed.

Other technical features may be readily apparent to one skilled in the art from the following figures, descriptions, and claims.

BRIEF DESCRIPTION OF THE DRAWINGS

For a more complete understanding of this disclosure, reference is now made to the following description, taken in conjunction with the accompanying drawings, in which.

DETAILED DESCRIPTION

FIGS. 1 through 10, discussed below, and the various embodiments used to describe the principles of the present invention in this patent document are by way of illustration and should not be construed in any way to limit the scope of the invention. Those skilled in the art will understand that the principles of the disclosure may be implemented in any type of suitably arranged device or system.

For simplicity and clarity, some features and components are not explicitly shown in every figure, including those illustrated in connection with other figures. It will be understood that all features illustrated in the figures may be employed in any of the embodiments described in this patent document. Omission of a feature or component from a particular figure is for purposes of simplicity and clarity and not meant to imply that the feature or component cannot be employed in the embodiment(s) described in connection with that figure.

Figure 1:
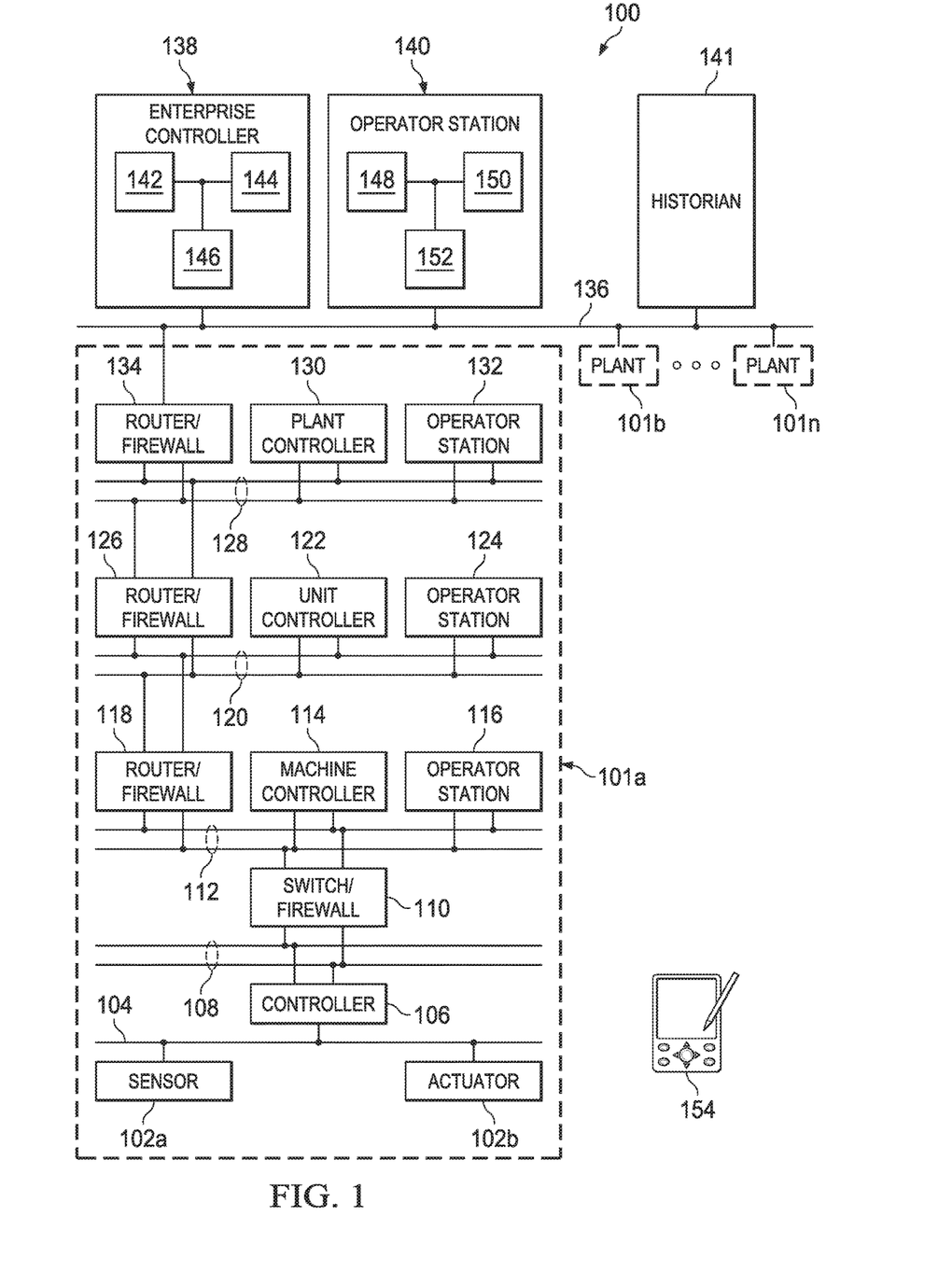
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As particular examples, the network 104 could represent an Ethernet network, an electrical signal network (such as a HART or FOUNDATION FIELDBUS network), a pneumatic control signal network, or any other or additional type(s) of network(s).

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a multivariable controller, such as a Robust Multivariable Predictive Control Technology (RMPCT) controller, or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As particular examples, the networks 108 could represent a pair of Ethernet networks or a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as a pair of Ethernet networks or an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS or other operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS or other operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as a pair of Ethernet networks or an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS or other operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS or other operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as a pair of Ethernet networks or an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS or other operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS or other operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS or other operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Access to the enterprise-level controllers 138 may be provided by one or more operator stations 140. Each of the operator stations 140 includes any suitable structure for supporting user access and control of one or more components in the system 100. Each of the operator stations 140 could, for example, represent a computing device running a MICROSOFT WINDOWS or other operating system.

Various levels of the Purdue model can include other components, such as one or more databases. The database(s) associated with each level could store any suitable information associated with that level or one or more other levels of the system 100. For example, a historian 141 can be coupled to the network 136. The historian 141 could represent a component that stores various information about the system 100. The historian 141 could, for instance, store information used during production scheduling and optimization. The historian 141 represents any suitable structure for storing and facilitating retrieval of information. Although shown as a single centralized component coupled to the network 136, the historian 141 could be located elsewhere in the system 100, or multiple historians could be distributed in different locations in the system 100.

In particular embodiments, the various controllers and operator stations in FIG. 1 may represent computing devices. For example, each of the controllers could include one or more processing devices 142 and one or more memories 144 for storing instructions and data used, generated, or collected by the processing device(s) 142. Each of the controllers could also include at least one network interface 146, such as one or more Ethernet interfaces or wireless transceivers. Also, each of the operator stations could include one or more processing devices 148 and one or more memories 150 for storing instructions and data used, generated, or collected by the processing device(s) 148. Each of the operator stations could also include at least one network interface 152, such as one or more Ethernet interfaces or wireless transceivers.

In some embodiments, one or more wireless devices 154 could be used in the system 100. For example, the wireless devices 154 could be used by personnel out in the field to interact with or configure various components in the system 100. Each wireless device 154 includes any suitable mobile computing device, such as a laptop computer, smartphone, personal digital assistant (PDA), or other portable wireless device. Each wireless device 154 could include one or more processing devices, one or more memories for storing instructions and data used/generated/collected by the processing device(s), and at least one network interface (such as one or more wireless transceivers) for wireless communications.

As discussed above, it is often very difficult to create software that scales from the smallest hardware devices with only one thread of execution up to the largest of enterprise servers with large resource reserves. This can increase the time, efforts, and costs associated with software development in a large number of technology fields. A software design that uses an actor/director model while decoupling threads of execution used at runtime allows scaling of this type. For example, allowing a director to create actors and pass independent messages to the actors and having threads of execution that execute the messages externally (as opposed to the actors owning the threads of execution) allow more effective use of hardware no matter what hardware is available.

In accordance with this disclosure, software having an actor/director model design pattern could be deployed within the system 100 and executed by various devices having significantly different hardware capabilities (such as devices on some or all levels of the system 100). As a specific example, an OPC Unified Architecture (OPC UA) application could be created and deployed to the various controllers, operator stations, wireless devices, and/or other components within the system 100. Additional details regarding this functionality are provided below.

Although FIG. 1 illustrates one example of an industrial process control and automation system 100, various changes may be made to FIG. 1. For example, a control and automation system could include any number of sensors, actuators, controllers, operator stations, networks, servers, and other components. Also, the makeup and arrangement of the system 100 in FIG. 1 is for illustration only. Components could be added, omitted, combined, further subdivided, or placed in any other suitable configuration according to particular needs. Further, particular functions have been described as being performed by particular components of the system 100. This is for illustration only. In general, control and automation systems are highly configurable and can be configured in any suitable manner according to particular needs. In addition, FIG. 1 illustrates an example environment in which software having an actor/director model design pattern could be executed. Software having an actor/director model design pattern could be executed in any other suitable system, and that system need not relate to industrial process control.

Figure 2:
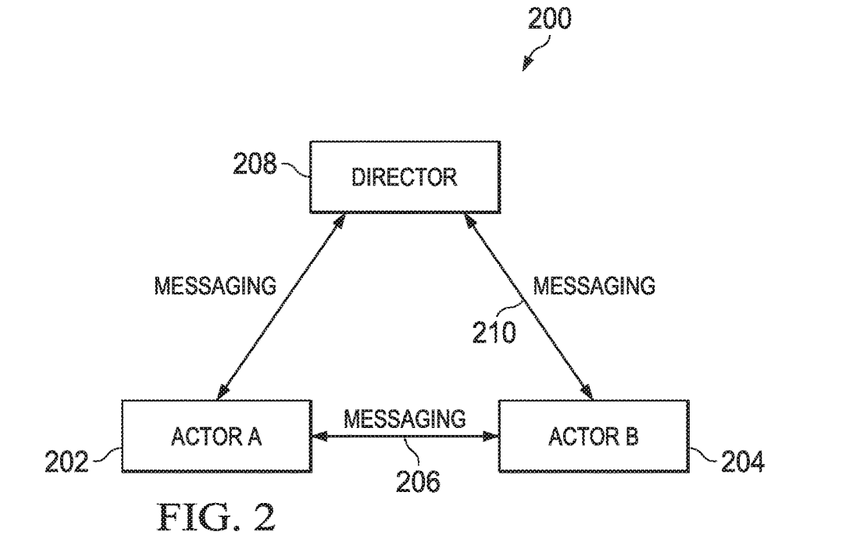
FIG. 2 illustrates an example actor/director model design pattern for software according to this disclosure.

FIG. 2 illustrates an example actor/director model design pattern 200 for software according to this disclosure. The actor/director model design pattern 200 supports a model in which software is decomposed into a set of "actors" and "directors," where the actors provide desired functionalities for the software and the directors control the creation and use of the actors.

In ordinary actor model design, a software system is composed of multiple components known as active objects or "actors." These actors communicate with each other by sending and receiving messages. Conceptually, the actors can operate concurrently in that the actors consume and process messages on receipt and can send messages to other actors at will.

The ordinary actor model design typically encapsulates a state, a message queue, and a thread of execution within each actor. However, this design approach has several limitations. For example, encapsulating a dedicated thread of execution within each actor means that the thread count in a given system is proportional to the number of actors created. This can result in very large system resource utilization when many actors are created, potentially starving the system of resources or resulting in impaired system performance. In addition, encapsulating a dedicated thread of execution within each actor means that actors may not be able to be dynamically created in a system where the available thread count is predefined and limited. Moreover, such a model cannot be implemented on a single threaded system, as multiple threads are not available. These limitations can result in a software system that is limited in its portability since it may be undesirable or impossible to create the required number of threads on a given platform.

The actor/director model design pattern 200 of FIG. 2 takes these and other issues into consideration. As shown in FIG. 2, the actor/director model design pattern 200 includes multiple actors 202-204 and at least one director 208. The actors 202-204 communicate via messages 206. Each actor 202-204 includes state information and has the ability to invoke computations on its state information. For example, in response to incoming messages 206, each actor 202-204 can invoke various computations involving its state information and interact with other actors via additional messages 206, such as to pass the results of the computations or to invoke additional computations on other state information. In some embodiments, the actors 202-204 may only be able to affect each other through the exchange of messages 206.

Each actor 202-204 in FIG. 2 denotes logic that when executed provides any desired functionality. While only two actors 202-204 are shown in FIG. 2 for convenience, the actor/director model design pattern 200 could include any number of actors that collectively perform any desired overall functionality of a software system.

The director 208 generally operates to create the actors 202-204 and control the operations of the actors 202-204 via messages 210. Each director 208 in FIG. 2 denotes logic that when executed controls the creation or use of actors. While only one director 208 is shown in FIG. 2 for convenience, the actor/director model design pattern 200 could include any number of directors that collectively oversee any number of actors.

Although FIG. 2 illustrates one example of an actor/director model design pattern 200 for software, various changes may be made to FIG. 2. For example, there may be any number of actors that are associated with any number of directors in an actor/director model design pattern. Also, the functionality of the directors could be incorporated into one or more actors so that an actor/director model design pattern actually includes only actors.

Figure 3:
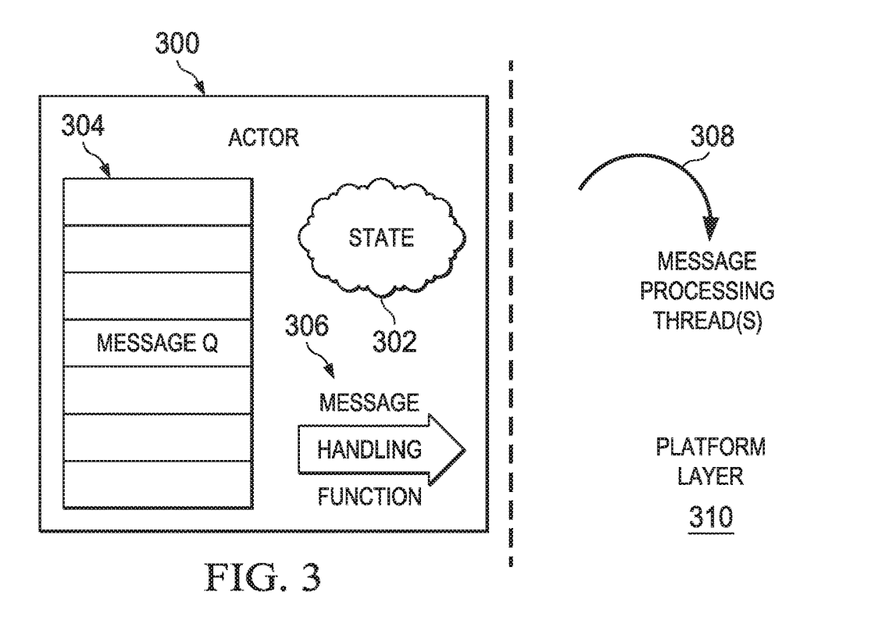
FIG. 3 illustrates an example actor in an actor/director model design pattern for software according to this disclosure.

FIG. 3 illustrates an example actor 300 in an actor/director model design pattern for software according to this disclosure. The actor 300 shown in FIG. 3 could, for example, denote either of the actors 202-204 shown in FIG. 2. For ease of explanation, the actor 300 shown in FIG. 3 may be described with respect to the actor/director model design pattern 200 of FIG. 2, although the actor 300 could be used in any other suitable manner.

As shown in FIG. 3, the actor 300 generally includes at least one set of state information 302 and at least one message queue 304. The state information 302 generally denotes information associated with the actor 300, such as information that the actor 300 needs to process in order to provide some desired functionality. The message queue 304 generally denotes a storage into which incoming messages 206 and 210 can be stored for immediate or delayed execution. The actor 300 could include any suitable state information 302, and the message queue 304 could include any suitable number of entries.

The actor 300 also includes at least one message handling function 306. As discussed above, in ordinary actor model design, an actor would include a dedicated message processing thread that "blocks" on a message queue, meaning the message processing thread would be scheduled to run only when at least one message is sent to the actor and placed in the message queue. However, when a dedicated message processing thread is bound to each actor, a defined number of threads need to be created for a given set of actors. This limits the portability of the software since it may be undesirable or impossible to create that many threads on a given hardware platform. Also, a set of multiple actors could not be executed on a single-thread platform in many cases.

In accordance with this disclosure, message processing threads 308 are decoupled or separated from actors 300 via a platform layer 310 and a corresponding application programming interface (API). The message handling functions 306 of the actors 300 can call message processing threads 308 in an external thread pool via the API. Each actor 300 can still have a logical dedicated thread of execution. However, the external thread pool can be used to call specific message processing threads 308 for the actors 300 based on commands from the message handling functions 306. Thus, the physical thread can be shared across multiple actors or even all actors in the system.

An actor 300 processes incoming messages by scheduling itself to be processed on a thread pool containing one or more threads 308. A conventional thread pool is often a container that contains a number of threads that can be used by one or more applications. In this disclosure, the thread pool is an abstract interface that actors 300 interact with in order to schedule themselves for execution. The details of the thread pool implementation and the number of threads are platform-specific and are hidden from the actor 300 via an interface.

Actors 300 process their received messages in a run-to-completion fashion, which allows multiple actors 300 to share the same thread 308 without blocking the thread 308. This allows the thread pool size to be scaled from a single thread to a large number of threads in accordance with the characteristics of the platform on which software (including an actor 300) is being executed. The number of threads in the thread pool can be independent of the number of actors being executed. This design makes the actor/director model portable across a wide range of platforms, from single-threaded platforms that do not have an operating system (OS) through single-core platforms that support multiple threads up to large multicore Symmetric Multi-Processing (SMP) systems or other systems with very large numbers of cores.

The thread pool can be multi-threaded or single-threaded, depending on implementation. In the multi-threaded configuration, the thread pool contains one or more dedicated threads. When an actor 300 is scheduled to run, it is queued for execution and is run on the next available thread.

In the single-threaded configuration, the thread pool contains no dedicated threads. That is, the thread pool does not contain dedicated threads, as the only thread of execution available is that belonging to the application itself. In this mode of operation, the thread pool can be considered a queue of references to actors 300 that are scheduled for execution. The actors 300 are executed consecutively by the application polling the thread pool interface from the main thread at some point in the future. This gives the appearance of concurrent actor execution on threads in a thread pool, whereas in fact the actors 300 are being executed in turn on the main application thread by polling. The interface is referred to as a thread pool and the actors 300 are unaware of the implementation details, but in fact there are no dedicated threads contained within it, merely a queue of references to actors 300 that are executed subsequently on the main application thread.

Further details regarding multi-threaded and single-threaded implementations are provided below with respect to FIGS. 5A and 5B.

Although FIG. 3 illustrates one example of an actor 300 in an actor/director model design pattern for software, various changes may be made to FIG. 3. For example, the message queue 304 could have any suitable number of entries, and the actor 300 could include any number of message handling functions 306 that call any number of message processing threads 308.

Figure 4:
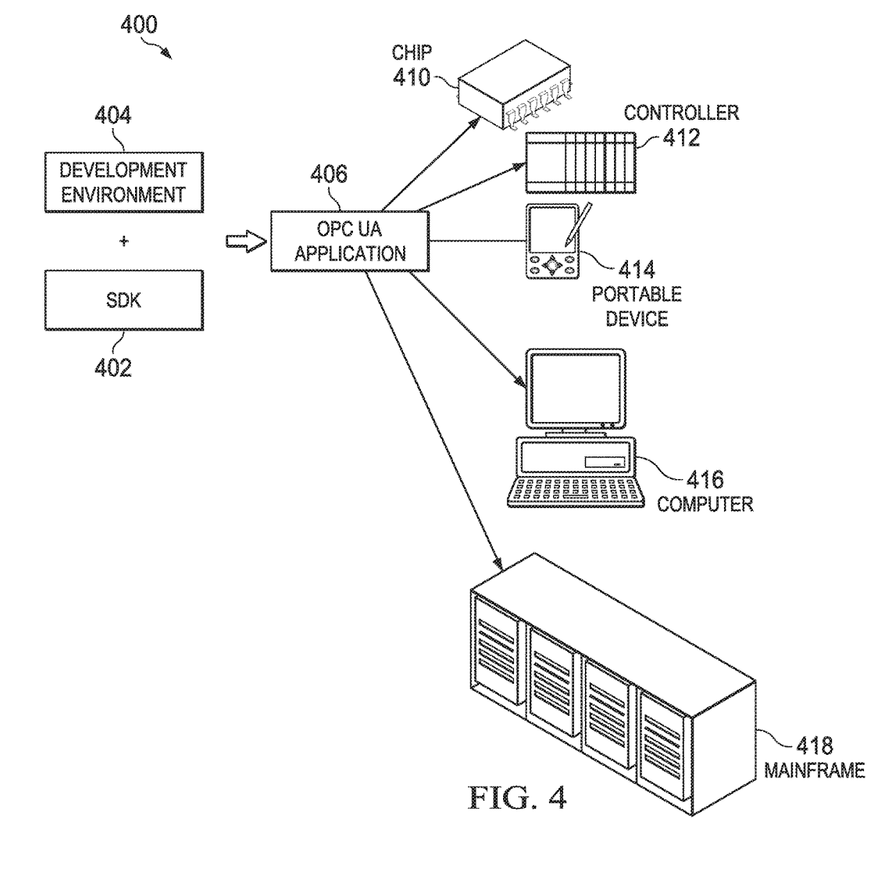
FIG. 4 illustrates an example deployment environment for software according to this disclosure.

Software designed with the actor/director model of FIG. 2 and actors designed as shown in FIG. 3 could be used in a number of ways. In some embodiments, software designed with the actor/director model of FIG. 2 and actors designed as shown in FIG. 3 could be packaged as a software development kit (SDK) that can be added to a wide range of platforms. FIG. 4 illustrates an example deployment environment 400 for software according to this disclosure.

As shown in FIG. 4, a user could take an SDK 402, add the SDK 402 to a development environment 404, and compile the SDK 402 into an application or software product 406. This allows users to take advantage of the SDK 402 on any suitable platform 410-418, including a chip 410, a controller 412, a portable device 414, a computer 416, and a mainframe or server 418.

In particular embodiments, the SDK 402 can be supplied as obfuscated source code. The actor/director model would be internal to the SDK 402, and the users could interact with the actors or directors using software interfaces. Also, in particular embodiments, the SDK 402 could be a connectivity SDK that provides information modelling and IP-based connectivity by implementing the OPC UA standard. Further, in particular embodiments, the SDK 402 can provide secure, reliable, and scalable connectivity to electronic devices and systems to enable the Industrial Internet of Things (IIOT).

In some embodiments, the SDK 402 implements the actor/director model in C++. Of course, this is merely one example. In other embodiments, the SDK 402 can implement the actor/director model in other programming languages, including C, C#, or Java.

This design for software development allows a single code base to be used on smaller hardware (such as sensors, actuators, and small embedded computers) all the way through mobile applications right up to more powerful hardware (such as enterprise applications). The use of the single code base means greater productivity in allowing a single software package (such as the SDK 402) to be used by an organization, reducing or eliminating the need to write and maintain different code bases.

This design for software development is also very efficient at providing desired functionalities to users and can give users very high performance compared to traditional resource-coupled models. The traditional model of software development ties threads of execution to software components, limiting scalability because different host platforms have different hardware limits. This design for software development removes that coupling, meaning hardware can be used up to the maximum extent possible while having any number of actors and directors (each executed when a thread of execution becomes available).

Although FIG. 4 illustrates one example of a deployment environment 400 for software, various changes may be made to FIG. 4. For example, there may be additional or alternative platforms to which software can be deployed, including sensors and actuators.

Figure 5A:
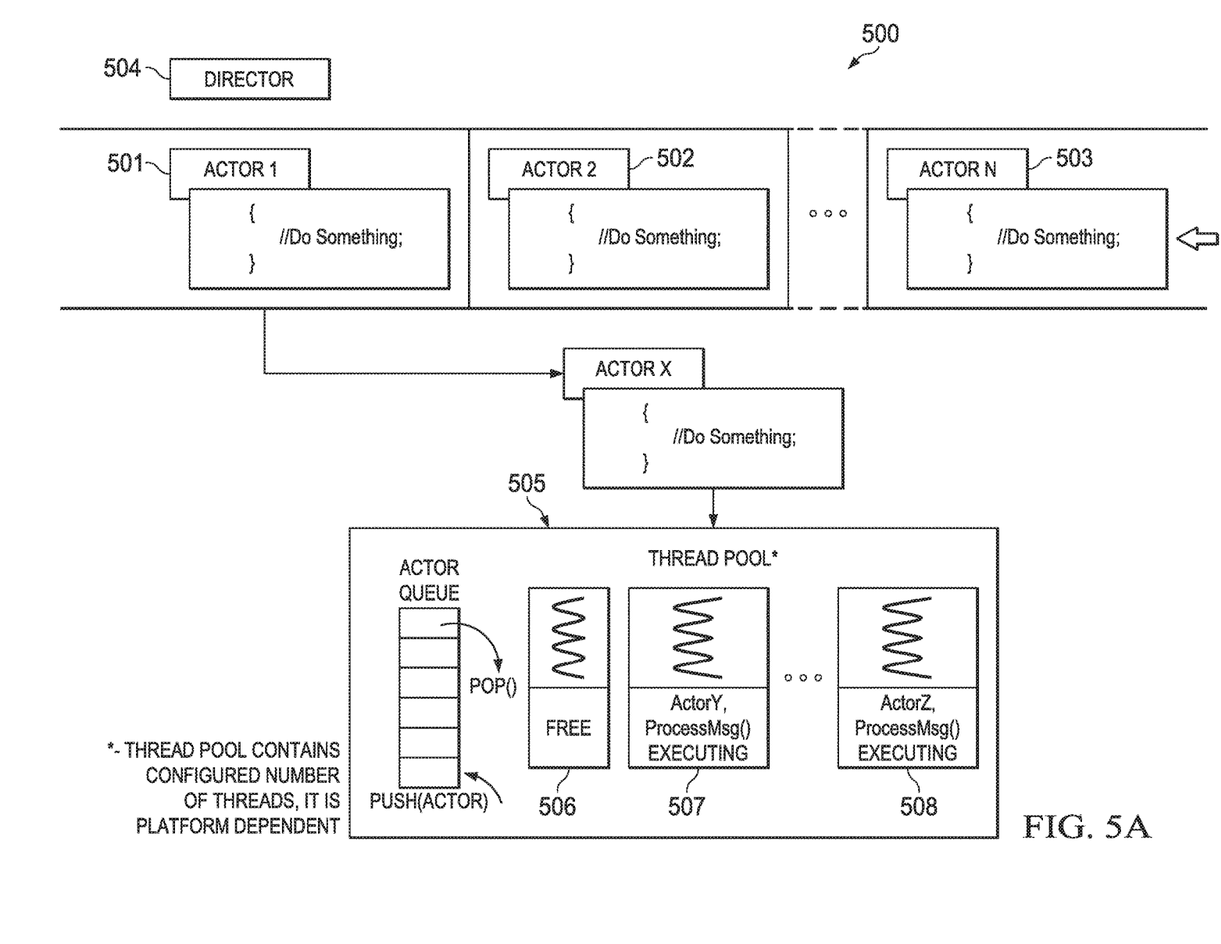
FIG. 5A illustrates an example of actor execution on a multi-threaded platform according to this disclosure.

FIG. 5A illustrates an example of actor execution on a multi-threaded platform 500 according to this disclosure. As shown in FIG. 5A, the platform 500 includes multiple actors 501-503 and a director 504 that can create and manage one or more of the actors 501-503. Each actor 501-503 could represent (or be represented by) one of the actors 202-204 of FIG. 2 or the actor 300 of FIG. 3. The director 504 could represent (or be represented by) the director 208 of FIG. 2. The platform 500 also includes a thread pool 505 containing one or more threads 506-508. Each of the threads 506-508 could represent (or be represented by) the threads 308 of FIG. 3.

Rather than encapsulating an actual thread (as in ordinary actor model design), the actors 501-503 are scheduled for execution on the thread pool 505. Each actor 501-503 consumes one or more received messages, updates its internal state, optionally sends one or more messages to other actors 501-503, and executes on at least one of the threads 506-508 to completion. Once the actor 501-503 has completed execution using a thread 506-508, the thread 506-508 can be released to make the thread 506-508 available for other actors 501-503. If an actor's message queue contains multiple messages, at least one thread 506-508 can be repeatedly scheduled for execution until all messages are consumed.

Figure 5B:
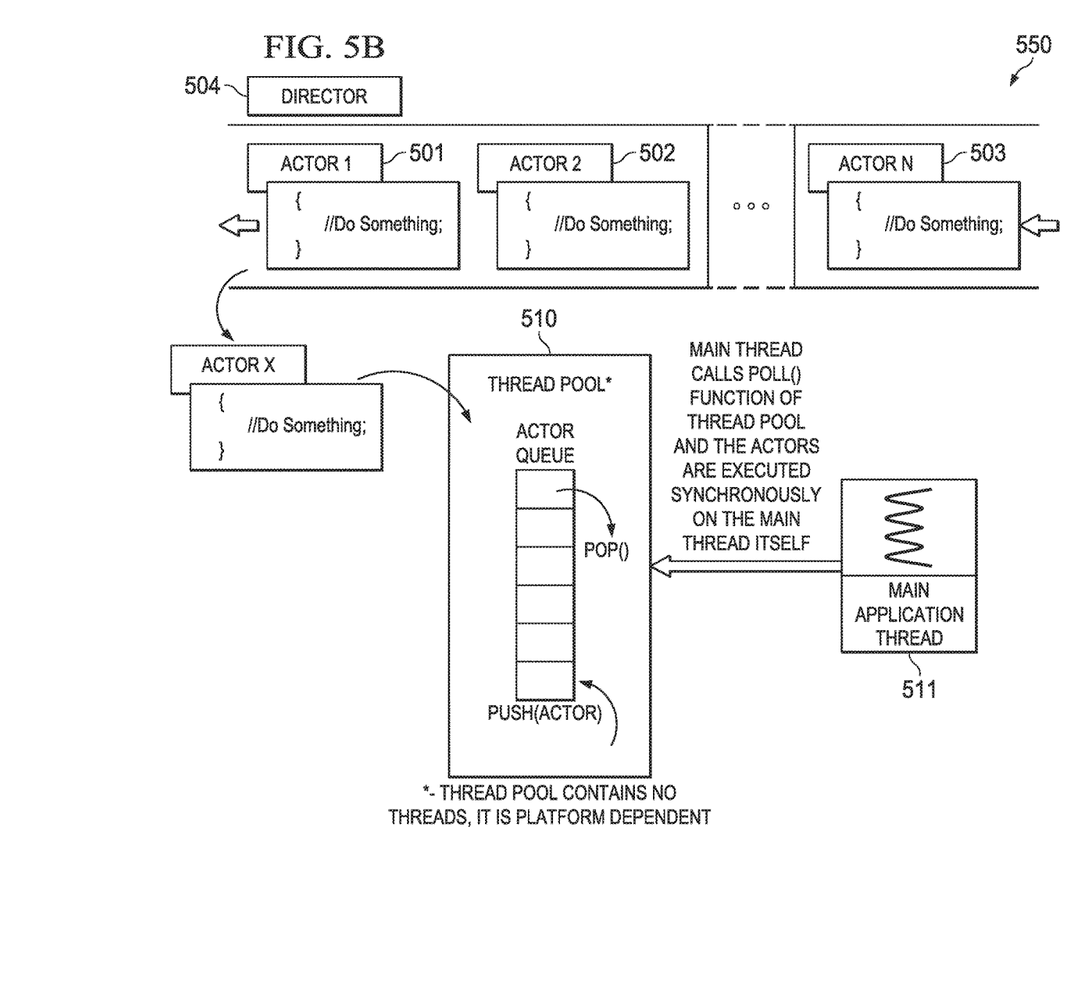
FIG. 5B illustrates an example of actor execution of a single-threaded platform according to this disclosure.

FIG. 5B illustrates an example of actor execution on a single-threaded platform 550 according to this disclosure. As shown in FIG. 5B, the platform 550 includes multiple actors 501-503 and a director 504 that can create and manage one or more of the actors 501-503. Each actor 501-503 could represent (or be represented by) one of the actors 202-204 of FIG. 2 or the actor 300 of FIG. 3. The director 504 could represent (or be represented by) the director 208 of FIG. 2.

Rather than encapsulating an actual thread (as in ordinary actor model design), the actors 501-503 are scheduled for execution on a notional "thread pool" 510 that is associated with a main application thread 511. Each actor 501-503 consumes one or more received messages, updates its internal state, optionally sends messages to other actors 501-503, and then executes to completion to make the thread 511 available for other actors 501-503. If an actor's message queue contains multiple messages, the thread 511 can be repeatedly scheduled for execution until all messages are consumed.

The thread pool 510 can have the same interface as the multi-threaded thread pool 505 of FIG. 5A and can appear identical to the actors 501-503. In this implementation, however, the thread pool 510 does not actually contain any dedicated threads, and the actors 501-503 are executed on the main application thread 511 when it polls the thread pool.

Figure 6:
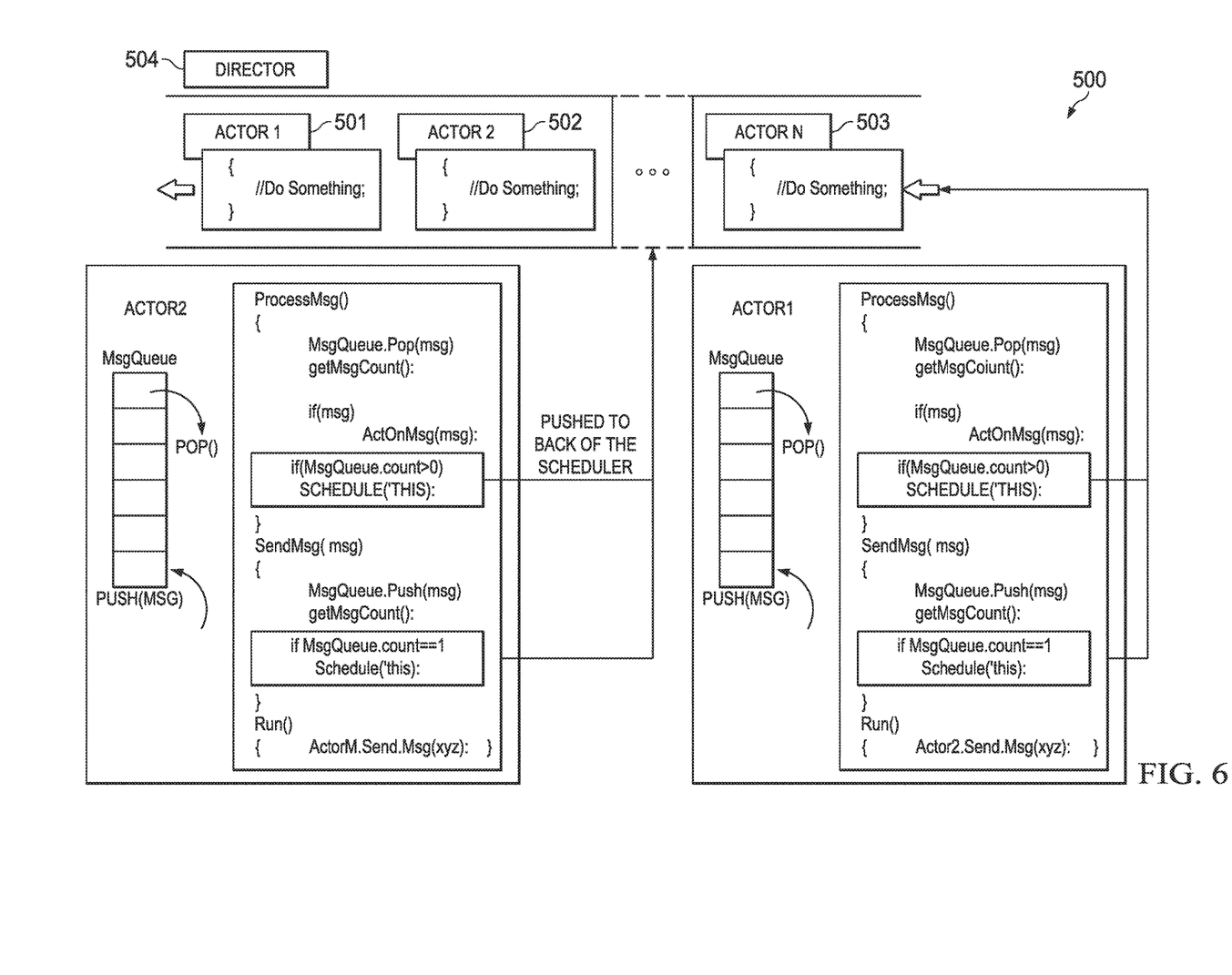
FIG. 6 illustrates example pseudocode for operation of multiple actors in a multi-threaded platform according to this disclosure.

FIG. 6 illustrates example pseudocode for operation of multiple actors in a multi-threaded platform 500 according to this disclosure. As shown in FIG. 6, Actor1 501 has received a message and is scheduled for execution. The sender of the message has called Actor1::SendMsg( ) which results in Actor1 scheduling itself to be executed on the thread pool, and the function Actor1::ProcessMsg( ) is called on a thread from the thread pool. (Of course, in a single-threaded case, all actors are executed on the main application thread, as there are no additional dedicated threads contained within the thread pool.) Actor1 501 "pops" (i.e., retrieves) the message from its message queue and acts on the message.

The function Actor1::ActOnMsg( )calls the internal function Actor1 ::Run( ) which consumes the message, updates the internal state, and sends a message "xyz" to Actor2 502 by calling the function Actor2::SendMsg( ). The function Actor2::SendMsg( )schedules Actor2 502 to be run if it is not already scheduled to do so. Upon returning to the function Actor1::ProcessMsg( ) Actor1 501 schedules itself to be run again if there are further messages remaining in its queue.

Although FIGS. 5A and 6 illustrate one example of a multi-threaded platform 500 and one example of its use, various changes may be made to FIGS. 5A and 6. For example, the multi-threaded platform 500 could have any suitable numbers of actors, directors, and threads. Also, the specific use of the platform 500 shown in FIG. 6 is for illustration only. Although FIG. 5B illustrates one example of a single-threaded platform 550, various changes may be made to FIG. 5B. For example, the single-threaded platform 550 could have any suitable numbers of actors, directors, and threads.

Figure 7:
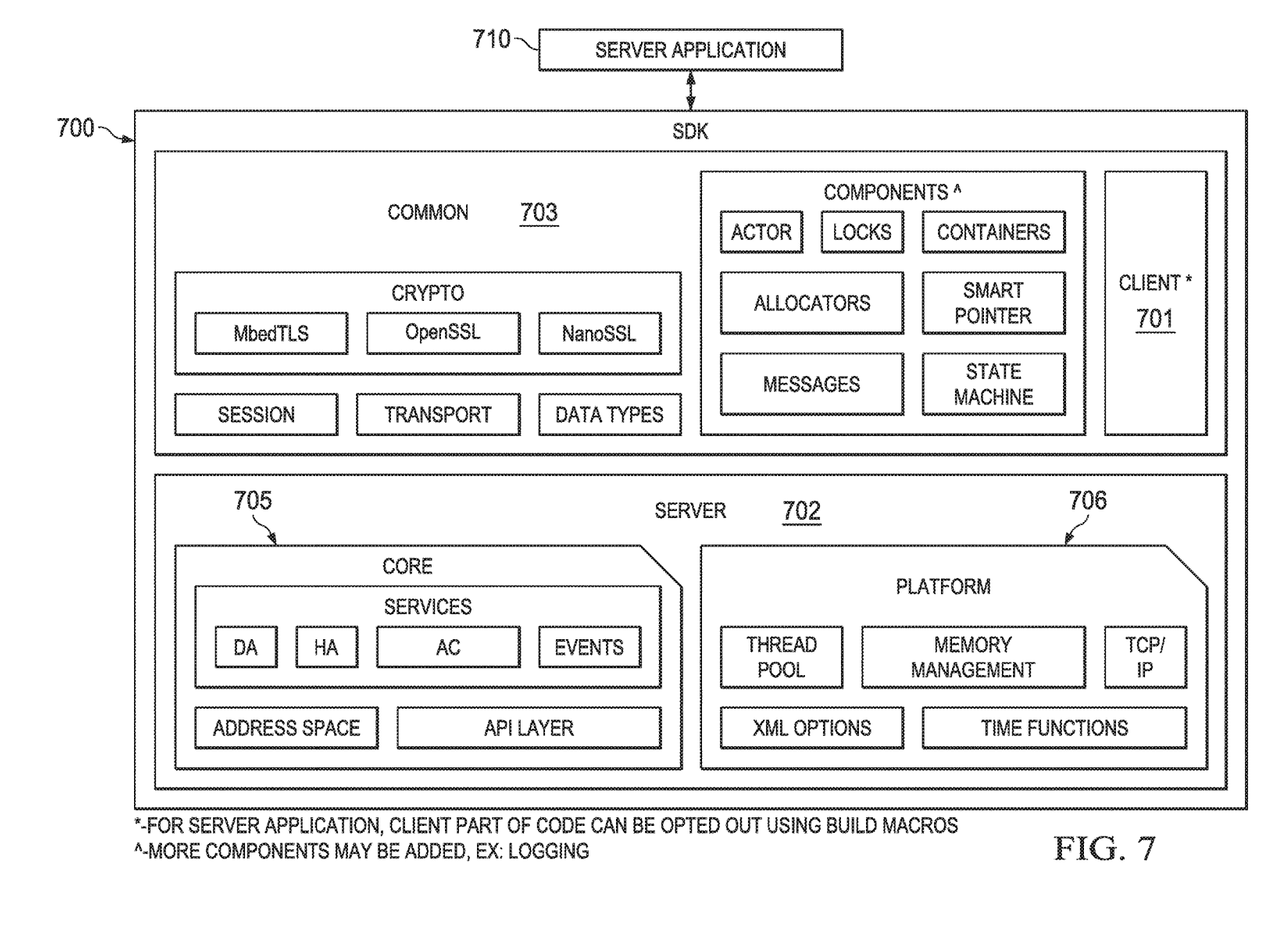
FIG. 7 illustrates an example software development kit (SDK) for development of software applications according to this disclosure.

FIG. 7 illustrates an example SDK 700 for development of software applications according to this disclosure. As shown in FIG. 7, a server application 710 can be developed and implemented using the SDK 700. The SDK 700 may represent (or be represented by) the SDK 402 of FIG. 4. The SDK 700 can be used to develop applications (such as the server application 710) in accordance with the OPC UA standard to facilitate secure, standards-based communication between a client and a server over an IP network.

The SDK 700 includes client components 701, server components 702, and common components 703 (used for both client and server functionality). The server components 702 include both core components 705 and platform-specific components 706. The platform-specific components 706 provide threading, timing, and other functionality, while the core components 705 are implemented using actors in conjunction with a thread-safe address space component. As can be seen in FIG. 7, the thread pool is a platform-specific component 706.

Although FIG. 7 illustrates one example of an SDK 700 for development of software applications, various changes may be made to FIG. 7. For example, components could be added, omitted, combined, further subdivided, or placed in any other suitable configuration according to particular needs. Also, particular functions have been described as being performed by particular components of the SDK 700. This is for illustration only. In general, SDKs are highly configurable and can be configured in any suitable manner according to particular needs.

Figure 8:
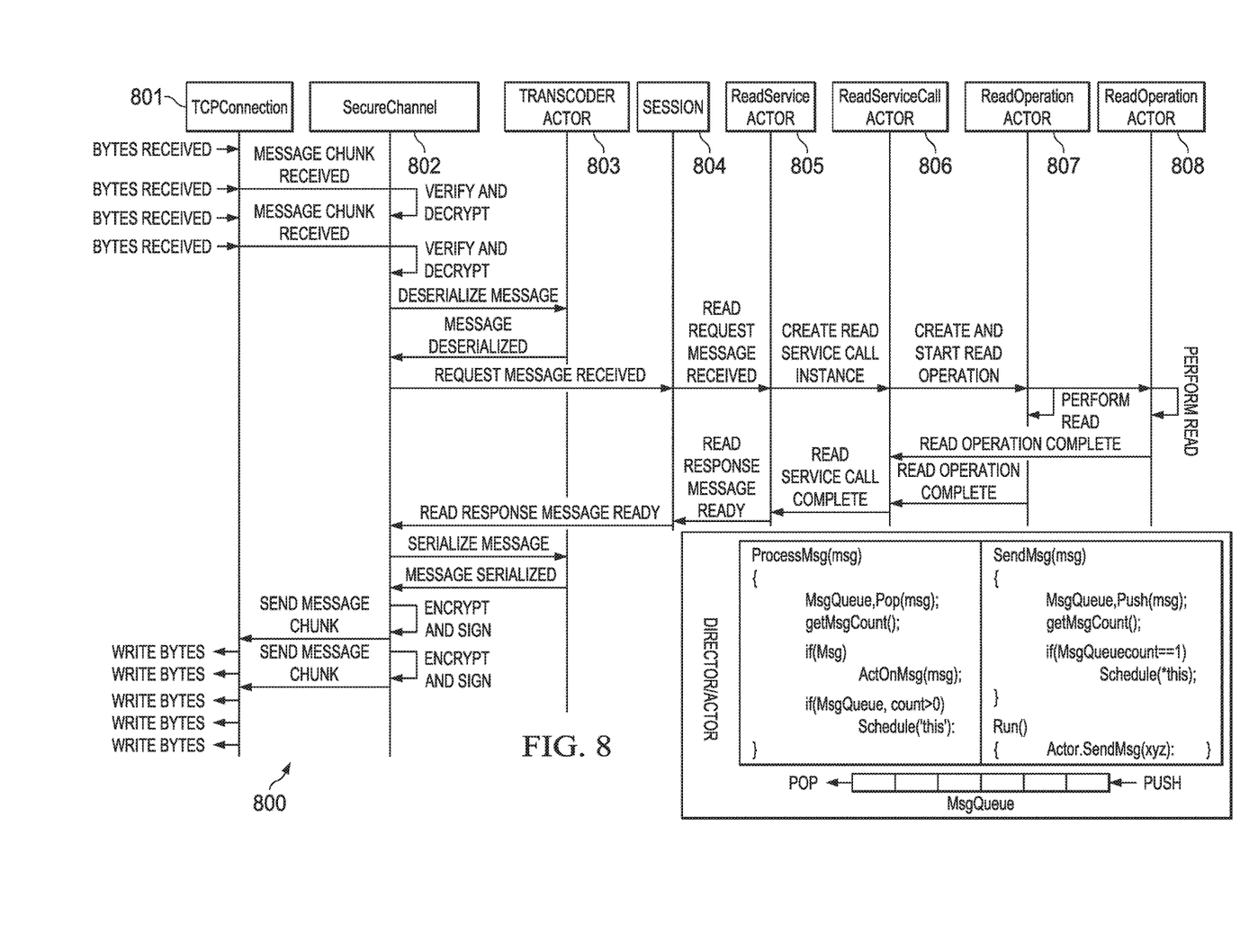
FIG. 8 illustrates an example interaction between actors and directors in a system according to this disclosure.

FIG. 8 illustrates an example interaction 800 between actors and directors in a system according to this disclosure. In particular, the actors and directors shown in FIG. 8 are associated with a server application that handles an OPC UA read request message received from a client application. The actors and directors in FIG. 8 include a TCP Connection 801, a Secure Channel 802, a Transcoder Actor 803, a Session Actor 804, a Read Service Director 805, a Read Service Call Actor 806, and Read Operation Actors 807-808.

The TCP Connection 801 receives a message chunk (such as part or all of a read request message) and pushes the chunk to a message queue MsgQueue of the Secure Channel 802 by calling the SecureChannel.SendMsg(MessageChunk) function.

The Secure Channel 802 retrieves (or "pops") the message chunk from its message queue and verifies and decrypts the message. The Secure Channel 802 creates the Transcoder Actor 803 (if it is not already created) and pushes the decrypted message to the message queue of the Transcoder Actor 803 by calling the Transcoder. SendMsg(DecryptedMsg) function for de-serialization.

The Transcoder Actor 803 retrieves the message from its message queue and de-serializes the decrypted message. The Transcoder Actor 803 pushes the de-serialized message to the Secure Channel 802 by calling the SecureChannel.SendMsg(De-SerializedMsg) function. The Transcoder Actor 803 goes out of scope if there are no more messages in the message queue.

The Secure Channel 802 retrieves the message from its message queue. The Secure Channel 802 recognizes the de-serialized message as a request for the Session Actor 804 and pushes a request message (RequestMsg) to the Session Actor 804 by calling the Session.SendMsg(RequestMsg) function.

The Session Actor 804 retrieves the message from its message queue. The Session Actor 804 recognizes the request message as a read request and pushes the read request to the Read Service Actor 805 by calling the ReadService.SendMsg(ReadRequest) function.

The Read Service Actor 805 retrieves the message from its message queue. The Read Service Actor 805 creates the Read Service Call Actor 806 and forwards the message to the Read Service Call Actor 806 by calling the ReadServiceCall.SendMsg(ReadRequest) function.

The Read Service Call Actor 806 retrieves the message from its message queue. The Read Service Call Actor 806 creates the Read Operation Actors 807-808 and pushes the read operations (ReadOperation) to one or both of the Read Operation Actors 807-808 by calling the Read Operation.SendMsg(ReadOperation) function.

The Read Operation Actors 807-808 retrieve the message from their message queue. The Read Operation Actors 807-808 get a node identifier (ID) associated with the read node and perform the read operation on the node ID from the address space. The Read Operation Actors 807-808 push a response (NodeVal) to the Read Service Call Actor 806 by calling the ReadServiceCall.SendMsg(NodeVal) function. The Read Operation Actors 807-808 can go out of scope if there are no more messages in the message queue.

The Read Service Call Actor 806 retrieves the message from its message queue. The Read Service Call Actor 806 pushes a response (ReadServiceResp) to the Read Service Director 805 by calling the ReadService.SendMsg(ReadServiceResp) function. The Read Service Call Actor 806 can go out of scope if there are no more messages in the message queue.

The Read Service Director 805 retrieves the message from its message queue. The Read Service Director 805 pushes a response (ReadResponseMsg) to the Session Actor 804 by calling the Session.SendMsg(ReadResponseMsg) function.

The Session Actor 804 retrieves the message from its message queue. The Session Actor 804 pushes a response (ResponseMsg) to the Secure Channel 802 by calling the SecureChannel.SendMsg(ResponseMsg) function.

The Secure Channel 802 retrieves the message from its message queue. The Secure Channel 802 creates the Transcoder Actor 803 (if the Transcoder actor 803 is not already created) and pushes a response to the Transcoder actor 803 by calling the Transcoder. SendMsg(Response) function for serialization.

The Transcoder Actor 803 retrieves the message from its message queue. The Transcoder actor 803 serializes the message and pushes the serialized message (SerializedMsg) to the Secure Channel 802 by calling the SecureChannel.SendMsg(SerializedMsg) function. The Transcoder actor 803 can go out of scope if there are no more messages in the message queue.

The Secure Channel 802 retrieves the message from its message queue. The Secure Channel 802 encrypts the serialized message into an encrypted message (EncryptedMsgChunk) and sends the encrypted message to the TCP Connection 801. The TCP Connection 801 sends the encrypted message to the client as a response.

Although FIG. 8 illustrates one example of an interaction 800 between actors and directors in a system, various changes may be made to FIG. 8. For example, the various actors, directors, and functions shown and described are specific to one type of interaction in one type of application. The actual actors, directors, and functions used can vary depending on the type of interaction and the type of application.

Figure 9:
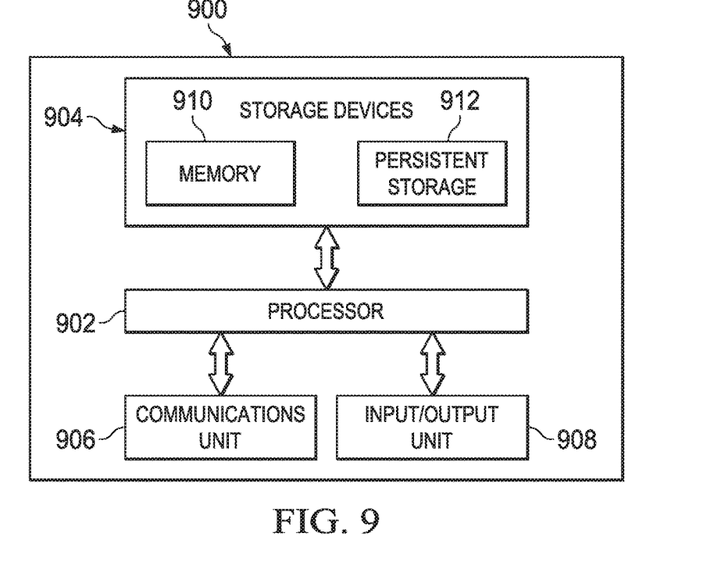
FIG. 9 illustrates an example device that could execute software having an actor/director model design pattern according to this disclosure.

FIG. 9 illustrates an example device 900 that could execute software having an actor/director model design pattern according to this disclosure. The device 900 could denote any suitable device used to execute software, such as resource-constrained devices up to enterprise-level devices. In particular, the device 900 could represent any of the components in FIG. 1.

As shown in FIG. 9, the device 900 includes at least one processor 902, at least one storage device 904, at least one communications unit 906, and at least one input/output (I/O) unit 908. Each processor 902 can execute instructions, such as those that may be loaded into a memory 910. Each processor 902 denotes any suitable processing device, such as one or more microprocessors, microcontrollers, digital signal processors, application specific integrated circuits (ASICs), field programmable gate arrays (FPGAs), or discrete circuitry.

The memory 910 and a persistent storage 912 are examples of storage devices 904, which represent any structure(s) capable of storing and facilitating retrieval of information (such as data, program code, and/or other suitable information on a temporary or permanent basis). In particular, the storage devices 904 could be used to store software instructions having the actor/director structure described above, where those software instructions are provided to the processor(s) 902 for execution. The memory 910 may represent a random access memory or any other suitable volatile or non-volatile storage device(s). The persistent storage 912 may contain one or more components or devices supporting longer-term storage of data, such as a read only memory, hard drive, Flash memory, or optical disc.

The communications unit 906 supports communications with other systems or devices. For example, the communications unit 906 could include at least one network interface card or wireless transceiver facilitating communications over at least one wired or wireless network. The communications unit 906 may support communications through any suitable physical or wireless communication link(s).

The I/O unit 908 allows for input and output of data. For example, the I/O unit 908 may provide a connection for user input through a keyboard, mouse, keypad, touchscreen, or other suitable input device. The I/O unit 908 may also send output to a display, printer, or other suitable output device.

Although FIG. 9 illustrates one example of a device 900 that could execute software having an actor/director model design pattern, various changes may be made to FIG. 9. For example, various components in FIG. 9 could be combined, further subdivided, rearranged, or omitted and additional components could be added according to particular needs. Also, computing devices come in a wide variety of configurations, and FIG. 9 does not limit this disclosure to any particular configuration of computing device.

Figure 10:
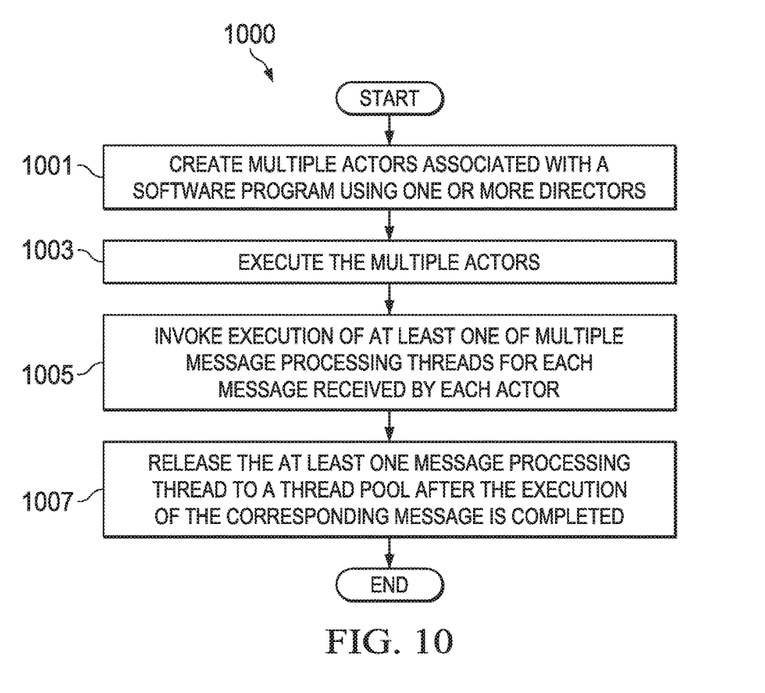
FIG. 10 illustrates an example method that can be performed using an actor/director model according to this disclosure.

FIG. 10 illustrates an example method 1000 that can be performed using an actor/director model according to this disclosure. For ease of explanation, the method 1000 is described as being performed using a computing device, such as the computing device 900 of FIG. 9. However, the method 1000 could be used with any suitable device or system.

At step 1001, multiple actors associated with a software program are created using one or more directors. This could include, for example, one or more directors 504 creating multiple actors 501-503. Each actor is associated with (i) data to be processed and (ii) a message queue configured to store messages received by the actor. The message queue could, for example, denote the message queue 304. Each message stored in the message queue could denote a message from the director(s) 504 or a message from another one of the actors 501-503.

At step 1003, the multiple actors are executed in the software program. This could include, for example, execution of one or more of the actors 501-503. The actors are executed to perform an operation, such as processing a read request from a client application.

At step 1005, execution of at least one message processing thread is invoked for each message received by each actor. This could include, for example, at least one message processing thread 506-508 in the thread pool 505 being automatically assigned and executed in response to receipt of a message from another actor or other software component. Each executed message processing thread is among multiple message processing threads contained in a thread pool that is external to the actors.

At step 1007, the at least one message processing thread is released to the thread pool after the execution of the corresponding message is completed. This could include, for example, the message processing thread 506-508 being released to the thread pool 505 after execution of the corresponding message.

Although FIG. 10 illustrates one example of a method 1000 that can be performed using an actor/director model, various changes may be made to FIG. 10. For example, while shown as a series of steps, various steps shown in FIG. 10 could overlap, occur in parallel, occur in a different order, or occur multiple times.

The actor/director model and the implementations described here provide a number of advantageous benefits and technological improvements. For example, the number of threads used in a system can be determined at any time, including during development or system startup. The number of threads can also vary dynamically during system operation. There is no thread-imposed limit on the number of actors that can be created since each actor does not require a dedicated thread resource. Each actor is decoupled from the thread, so there can be as many or as few threads as needed and as many or as few actors as needed.

The scalability and portability of the disclosed actor/director model allow deployment of a software system to diverse platforms. For example, the software can be deployed on single threaded platforms (including so-called bare metal platforms) or within a single thread of an operating system. The software can also be deployed on single-core multi-threaded platforms where interactive responses can be improved through the use of multiple threads. The software can further be deployed on multi-core multi-threaded platforms where interactive responses and performance can be improved through the use of multiple threads executing on multiple concurrent cores. To execute the software on different platforms, the software and the API do not need to be changed. Instead, a few modifications to parameters or settings in the platform layer can be made that relate to the type of platform or number of cores. This increases the applicability of the actor/director model and potentially reduces the costs associated with software licensing, development, maintenance, and support.

This type of approach can be used in a large number of possible environments. For example, industrial control and automation systems have changed from one of disparate runtime platforms, hardware, and software development environments to a much more converged environment. With the development of the Industrial Internet of Things and the increasing power of embedded processors in control devices, there has been significant convergence across platforms (such as a similarity of applications and toolkits across different platforms). The disclosed actor/director model promotes such convergence. Of course, this approach can be used for software development and execution in a large number of other technology fields.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in the present application should not be read as implying that any particular element, step, or function is an essential or critical element that must be included in the claim scope. The scope of patented subject matter is defined only by the allowed claims. Moreover, none of the claims invokes 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. A method comprising:
   creating and controlling multiple actors using one or more directors;
   executing multiple actors associated with a software program, each actor associated with (i) data to be processed and (ii) a message queue configured to store messages received by the actor;
   invoking execution of at least one message processing thread for each message received by each actor, the at least one message processing thread contained in a thread pool that is external to the actors, wherein the number of message processing threads in the thread pool is independent of the number of actors; and
   releasing the at least one message processing thread to the thread pool after the execution of the corresponding message is completed,
   wherein each message received by each actor comprises one of:
   a message from the one or more directors; and
   a message from another one of the actors.

2. The method of claim 1, wherein the at least one message processing thread is automatically assigned from the thread pool to execute each actor upon receipt of the each message.

3. The method of claim 1, wherein each actor invokes execution of the at least one message processing thread in the thread pool via an application programming interface (API).

4. The method of claim 1, wherein use of the actors and the at least one message processing thread allows the software program to be executed on different hardware devices supporting a different number of threads of execution.

5. The method of claim 4, wherein the different hardware devices comprise a chip, a controller, and a computer or server.

6. The method of claim 1, wherein the thread pool is a single-threaded thread pool and the at least one message processing thread comprises a single message processing thread that belongs to the software program.

7. An apparatus comprising:
   at least one memory configured to store multiple actors associated with a software program, each actor associated with (i) data to be processed and (ii) a message queue configured to store messages received by the actor; and
   at least one processor configured to:
   create and control multiple actors using one or more directors;
   execute the actors;
   invoke execution of at least one message processing thread for each message received by each actor, the at least one message processing thread contained in a thread pool that is external to the actors, wherein the number of message processing threads in the thread pool is independent of the number of actors; and
   release the at least one message processing thread to the thread pool after the execution of the corresponding message is completed,
   wherein each message received by each actor comprises one of:
   a message from the one or more directors; and
   a message from another one of the actors.

8. The apparatus of claim 7, wherein the at least one processor is further configured to automatically assign the at least one message processing thread from the thread pool to execute each actor upon receipt of the each message.

9. The apparatus of claim 7, wherein each actor is configured to invoke execution of the at least one message processing thread in the thread pool via an application programming interface (API).

10. The apparatus of claim 7, wherein the software program is configured to adapt to a number of message processing threads contained in the thread pool to support execution of the software program on different hardware devices supporting a different number of threads of execution.

11. The apparatus of claim 7, wherein the thread pool is a single-threaded thread pool and the at least one message processing thread comprises a single message processing thread that belongs to the software program.

12. A non-transitory computer readable medium containing instructions that, when executed by at least one processing device, cause the at least one processing device to:
   create and control multiple actors using one or more directors;

execute multiple actors associated with a software program, each actor associated with (i) data to be processed and (ii) a message queue configured to store messages received by the actor;

invoke execution of at least one message processing thread for each message received by each actor, the at least message processing thread contained in a thread pool that is external to the actors, wherein the number of message processing threads in the thread pool is independent of the number of actors; and release the at least one message processing thread to the thread pool after the execution of the corresponding message is completed, wherein each message received by each actor comprises one of:

a message from the one or more directors; and a message from another one of the actors.

13. The non-transitory computer readable medium of claim 12, wherein the at least one message processing thread is automatically assigned from the thread pool to execute each actor upon receipt of the each message.

14. The non-transitory computer readable medium of claim 12, wherein each actor is configured to invoke execution of the at least one message processing thread in the thread pool via an application programming interface (API).

* * * * *